April 1, 1924.                1,488,535
L. L. FORDE
RADIUS ROD SUPPORT
Filed June 22, 1923

Inventor
Lester L. Forde
By Church & Church
His Attorneys

Patented Apr. 1, 1924.

1,488,535

UNITED STATES PATENT OFFICE.

LESTER L. FORDE, OF SOUTH BOSTON, VIRGINIA.

RADIUS-ROD SUPPORT.

Application filed June 22, 1923. Serial No. 647,080.

*To all whom it may concern:*

Be it known that I, LESTER L. FORDE, a citizen of the United States, residing at South Boston, in the county of Halifax and State of Virginia, have invented certain new and useful Improvements in Radius-Rod Supports; and I do hereby declare the following to be a full, clear, and exact description of the same, reference being had to the accompanying drawing, forming part of this specification.

This invention relates to means for securing in place the radius rods on the front end of an automobile and has for its object the provision of means for exerting a constant tension on the nut on the bolt which supports the radius rod and usually forms the spring perch.

A further object of the present invention is the provision of means for holding the radius rods tight against the axle and preventing the radius rods from dropping down into engagement with the ground with consequent serious damage to the automobile, and possibly to the passengers.

The invention will be described in connection with a Ford car as that is the principal field of usefulness of the present device. In the earlier model Ford cars the radius rods were each secured above the front axle but a few years ago Mr. Ford altered the position of the radius rods, probably due to the great number of rods which broke at the knuckle, and redesigned the rods so that they should be fastened under the front axle upon the bolt of the spring perch and in recent models a castle nut holds the radius rods on the spring perch bolt.

So far it seems practically impossible to keep the radius rods tight which is objectionable not only because of the rattle caused by the slight play, but because of the great danger of these rods dropping down, engaging the ground and thereby causing serious injury to the car.

I overcome all the difficulties incident to the use of underhung radius rods by eliminating the cotter pin of the castellated nut and by substituting therefor a grease-encased spring tension device which not only entirely eliminates the objectionable rattling but overcomes all danger of the rods disengaging themselves from the spring perch bolt.

Figure 1:
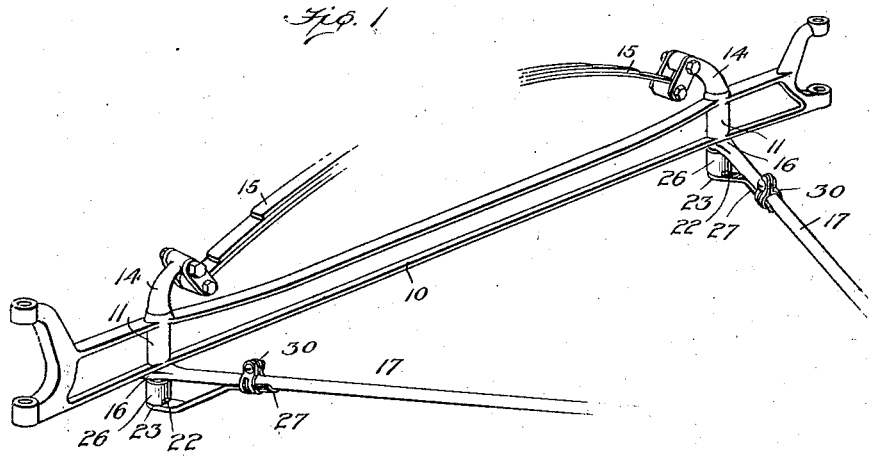
Figure 1 is a perspective view of a Ford automobile front axle and associated parts embodying the present invention.
Figure 2:
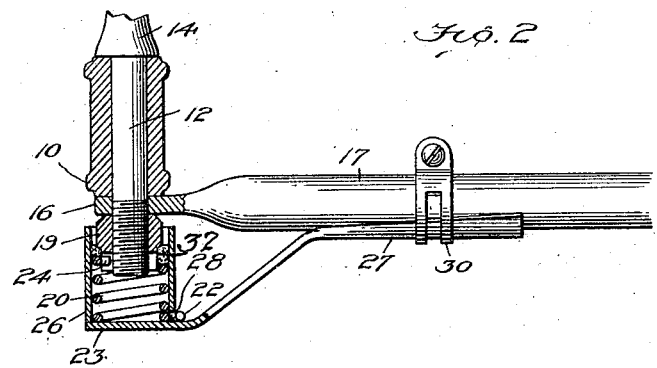
Fig. 2 is a front elevation, partly in section, of a portion of a front axle.
Figure 3:
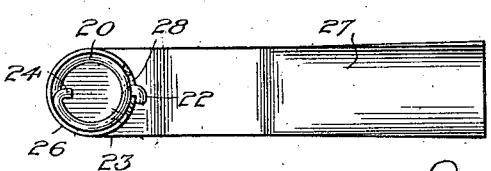
Fig. 3 is a top plan view of the spring and holder.

The numeral 10 denotes the front axle of the present style Ford car being of general I-beam construction carrying at the two ends the yokes for the steering mechanism of the front wheels and being swelled by hollow cylinders 11 which receive the bolts 12 of the perches 14 which support the front spring 15. Each bolt 12 passes entirely through the front axle and supports the head 16 of one of the radius rods 17 which is secured against the front axle by means of a castle nut 19 usually held in place by a wire or a cotter pin. With this construction there would seem to be little danger of the radius rods becoming detached from the front axle but unfortunately the fact remains that they do and hence I provide a spring tension device to hold the castle nut against the radius rod at all times with a yielding tension.

The spring 20 is here shown as a round wire spring coiled in helical shape with one end such as 22 anchored to the holder 23 and with its upper free end bent radially with respect to the helix to form a stud 24 to engage one of the slots in the castellated nut 19. The spring 20 is enclosed in a cylindrical receptacle 26 preferably of a section of brass or steel tubing closed at the bottom by the spring holder 23 which at inner end is curved or rounded as at 27 to fit the radius rods 17.

In the device as illustrated there is a small slot 28 in the bottom of the cylinder 26 and the anchoring of the spring is accomplished by passing the end 22 of the spring through this opening but if desired the cylinder 26 and the holder 23 may be integral in which case the end 22 of the spring 20 would pass through the holder 23 only or through it and also through the slot 28 in the grease receptacle cylinder 26, whichever is preferred.

To apply the device to an existing Ford car the usual cotter pin is removed and the castle nut tightened as far as it will go. The holder containing the spring 20 is now applied over the bolt 12 and is slid upwardly until the right-angular end 24 of the spring engages a slot of the castle nut while the rounded end 27 of the spring holder 23 is one hundred and eighty or more degrees from the position shown in Fig. 1.

The end of the holder is now turned about the axis of the spring perch bolt 12 as a pivot which has the effect of winding up or tightening the spring 20. The end 27 when brought to the position shown in Fig. 1 is clamped in such position by means of one or more clamps 30 of any preferred type here shown as the well-known and everywhere available garden hose clamps which serve admirably for the purpose intended.

Although not essential I find it highly advantageous to fill the receptacle 26 with a fairly heavy grease and to provide a felt packing 32 at the top of the cylinder 26 to prevent loss of such grease. Due to the constant and relatively strong tension exerted on the castle nut 19 by the relatively powerful spring 20 the nut 19 can never become sufficiently loose to permit rattling and by virtue of the property of the grease the nut 19 may be removed at any time with the greatest of ease after unclamping the end 27 and removing the spring and holder.

What I claim is:

1. A spring tension device for holding in place a castellated radius rod securing nut including a holder adapted to be clamped to the radius rod, a spring anchored to said holder and engageable with one of the slots of said nut and an open-ended receptacle enclosing said spring.

2. In combination, a holder having a longitudinally grooved end, means for clamping said end to a radius rod, a cylinder secured to said holder, a helical spring within said cylinder and anchored to said holder and an inwardly directed radially extended end on said spring.

3. In an automobile, the combination with a front axle, a spring perch bolt, a castellated nut on said bolt, and a radius rod engaging said bolt and axle and held by said nut, of a cylinder surrounding the lower end of said bolt, a spring within said cylinder detachably engaging one of the slots in said nut, a holder closing the lower end of said cylinder and having a channel shaped end engaging said radius rod, and a clamp for securing said channel end to said radius rod.

4. A radius rod support comprising a spring detachably engaging a radius rod supporting nut, a lever secured to said spring and adapted to wind said spring when it is engaged with said nut, and means for securing said lever in such position.

LESTER L. FORDE.